Feb. 10, 1953  M. DANZIGER  2,627,801
EXTENSIBLE CAKE PAN
Filed Aug. 3, 1949  3 Sheets-Sheet 1
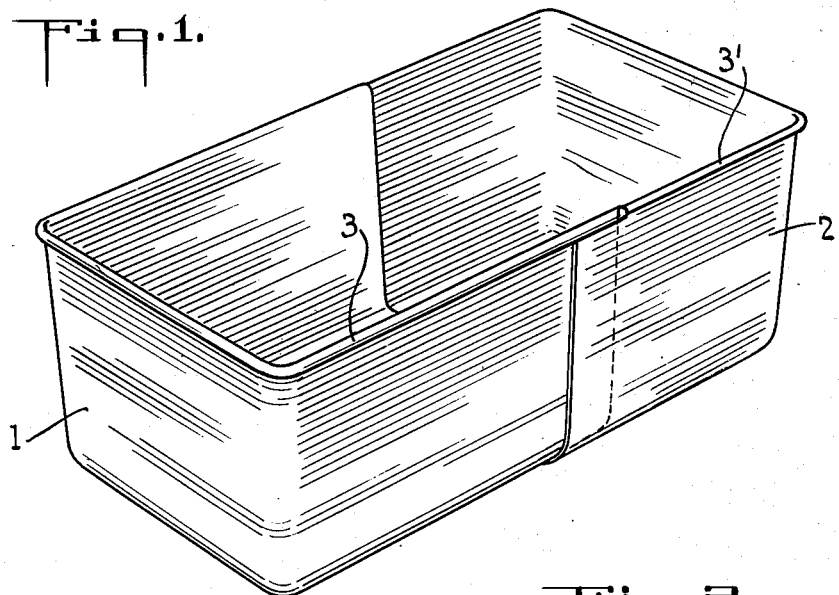
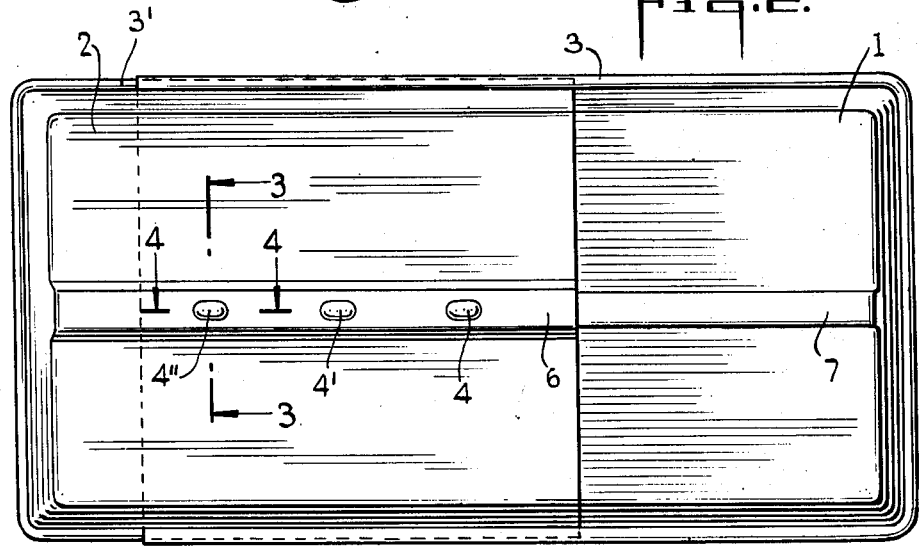
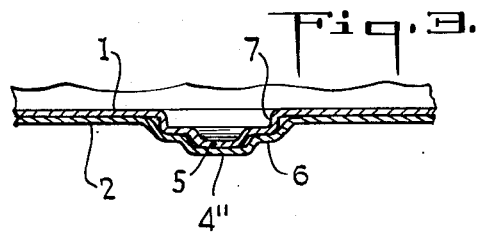
INVENTOR.
MANFRED DANZIGER
BY
ATTORNEY Feb. 10, 1953 M. DANZIGER 2,627,801
EXTENSIBLE CAKE PAN
Filed Aug. 3, 1949 3 Sheets-Sheet 2
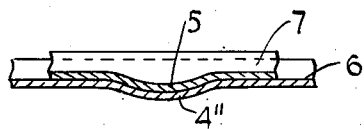
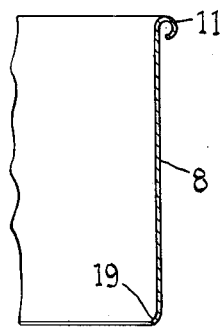
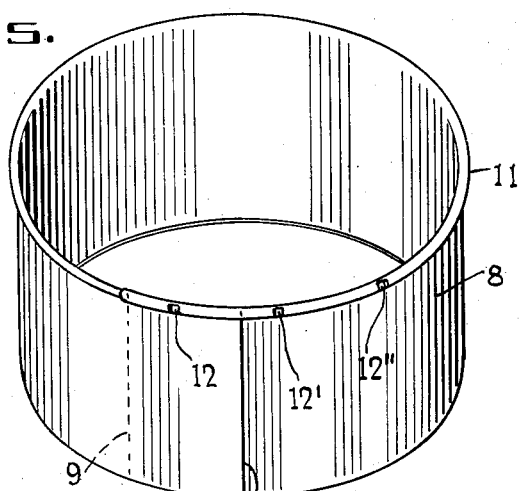
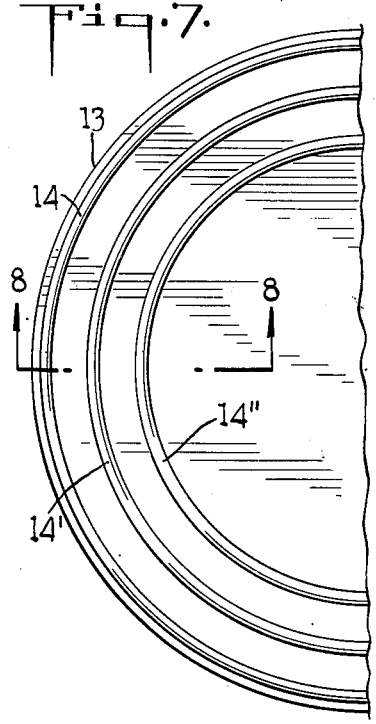
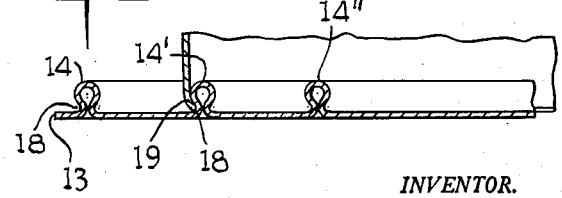
INVENTOR.
MANFRED DANZIGER
BY
ATTORNEY Feb. 10, 1953   M. DANZIGER   2,627,801
EXTENSIBLE CAKE PAN
Filed Aug. 3, 1949   3 Sheets-Sheet 3
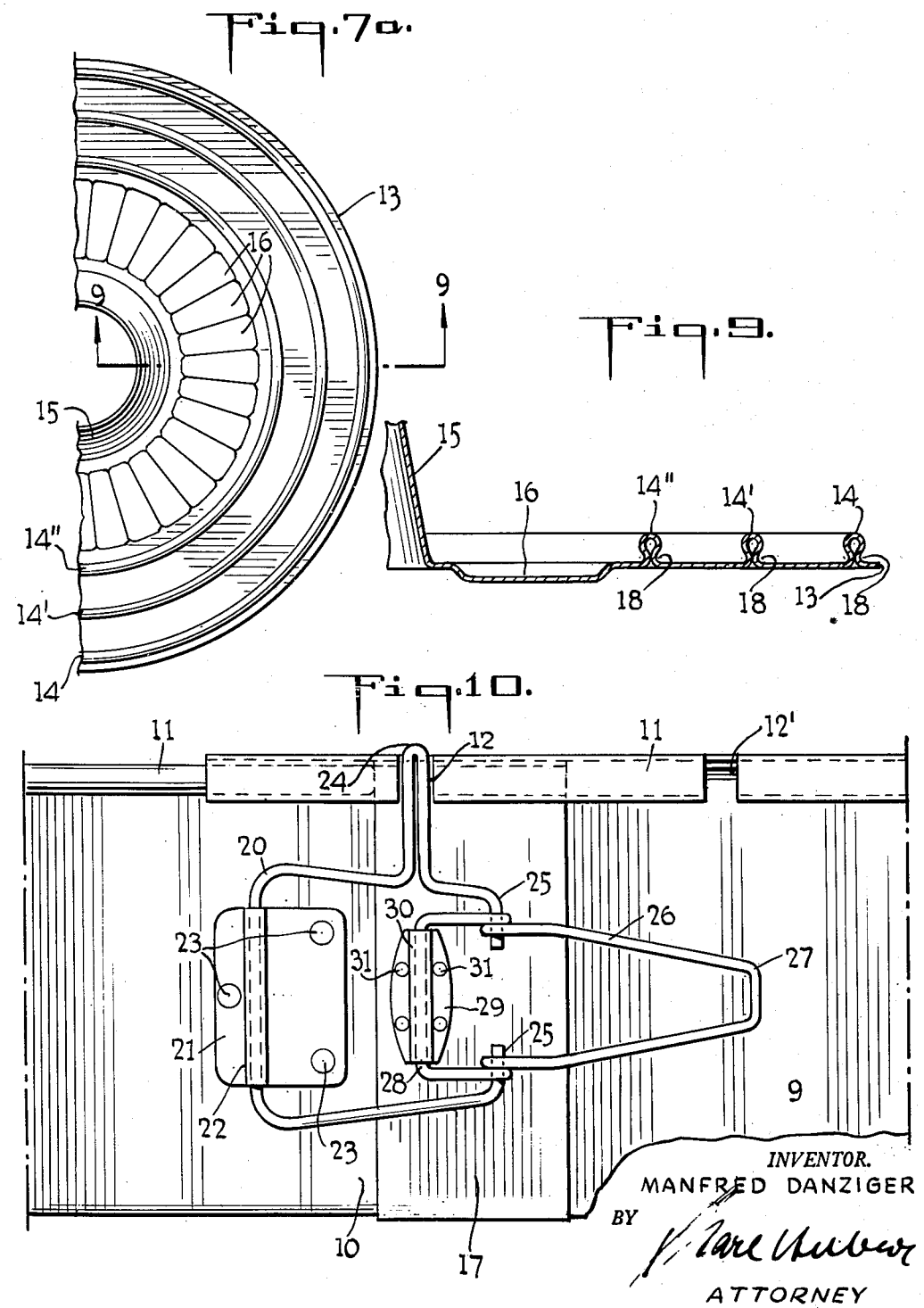
INVENTOR.
MANFRED DANZIGER
BY
ATTORNEY Patented Feb. 10, 1953

2,627,801

UNITED STATES PATENT OFFICE 2,627,801

EXTENSIBLE CAKE PAN

Manfred Danziger, Newark, N. J.

Application August 3, 1949, Serial No. 108,286

2 Claims. (Cl. 99—435)

The present invention deals with cake pans and more specifically is concerned with extensible cake pans.

Extensible cake pans—rectangular or round—are known in the art. Their purpose is to make possible the use of one pan for the baking of cakes of various sizes, i. e. to minimize the number of cake pans required in the average household and yet make possible the baking of a plurality of cake sizes.

The principal shortcoming of such extensible pans, which by necessity, inherent in their purpose, must be constructed in sections, has been the complicated nature of their locking devices, i. e. the means employed to hold the sections and parts in place on assembly to the desired size. Thus, prior devices have employed special loops or bands, turn buckles, etc. to interlock the parts involved. The home, for which such pans are intended, is, however, not a suitable place for the operation of such devices and, furthermore, some of the locking means are in the way of and prevent efficient and clean utilization of such pans. For these and other reasons the use of such extensible pans has not been accompanied by success.

It is one object of this invention to provide an extensible baking pan, for the baking of cakes, which shall be simple and efficient. It is another object of this invention to provide such adjustable baking pan with a minimum of parts and which shall be easy to manufacture and produce in quantity. It is a further object, a prime object, to provide such cake baking pans wherein the various sections or parts are held together and interlocked in a simple and efficient manner. Other objects and advantages of my invention will appear from the description thereof hereinafter following.

My invention is illustrated in the drawings, forming part hereof, in which:

Fig. 1 represents an elevational perspective view of one embodiment of the invention, partly in exploded view, Fig. 2 represents a bottom plan view of the embodiment of Fig. 1, Fig. 3 is a sectional view on the line 3—3 of Fig. 2, Fig. 4 is a sectional view on the line 4—4 of Fig. 2, Fig. 5 represents, in elevational perspective view, the sidewall of another embodiment of the invention, Fig. 6 represents a cross-sectional view of part of Fig. 5, Fig. 7 represents a top plan view of part of the bottom for the wall of Fig. 5, Fig. 7a represents a top plan view of part of the bottom, in modified form, for the wall of Fig. 5, Fig. 8 represents a cross-sectional view along the line 8—8 of Fig. 7, Fig. 9 represents a cross-sectional view along the line 9—9 of Fig. 7a, and Fig. 10 represents a wall locking device for the embodiment of Figs. 5–9.

Referring to Fig. 1, the pan is formed of two sections 1 and 2, open at one end, adapted to telescope into each other. Section 2 is shown of slightly larger diameter and is designed, on telescoping, to encompass section 1 on its side and along part of its length. Each section is provided with a beaded or curled rim 3 and 3', respectively, likewise designed to telescope one into the other. As shown, the larger dimensioned section 2 has a small and narrow rim 3' designed to fit into the larger and wider rim 3 of the smaller dimensioned section 1. For this reason both rims are folded over; at least the wider rim, 3, forming a tube open at its bottom near the wall to permit the telescoping entrance of the narrower rim which also may be folded over, or be solid, as desired. The two beaded rims are so formed and dimensioned that they are in tight and snug fit. At least the rim 3 is open along the lower edge so as to be able to receive therewithin the rim 3'. The bent-over rims 3 and 3' extend along the entire upper edge of the sections 1 and 2, thus contributing to the rigidity of the final device. The contact of rim 3' within rim 3 is one of firm frictional fit.

The bottoms of the two telescoping overlapping sections are interconnected by a series of buttons as shown in Figs. 2–4. In the embodiment shown there are three such buttons although of course a greater or lesser (but not less than two) number may be employed. The smaller section 1, encompassed by and overlying section 2, is thus provided with upwardly curved ridges 4, 4' and 4", and the larger encompassing section 2 is provided with like upwardly curved ridges 5 (and 5' and 5", not shown) corresponding to the ridges of the other section 2. The ridges are so designed as to fit over each other, as shown in more detail in Figs. 3 and 4, in light frictional fit, to form localized friction areas.

The buttons may have a circular or any other shape, although it has been found that an elongated shape, as shown in the drawings, especially Fig. 4, is most advantageous, the longer diameter being in the direction of the travel of the two body sections 1 and 2, as shown, so as to create a strong friction area in the direction in which on telescoping of the sections the greatest force is applied.

Advantageously the bottoms of sections 1 and 2 are each provided with a central, longitudinal channel 6 and 7. These channels serve to rigidify the sections along their longitudinal dimension. Any other rigidifying structural feature, e. g. one or more corrugations, may, of course, be used. Such rigidifying means extends, preferably, along at least the major part of the length of each section. Preferably, the local friction areas, e. g. buttons 4 and 5, are, as shown, arranged along the rigidifying channel. Also, it is advantageous that the rigidifying means of sections 1 and 2 are in intimate contact along their length, as shown.

The action of the rims 3 and 3' combined with that of the friction areas formed by the ridges 4 and 5 provides a firm interlocking of the two sections 1 and 2, assisted, advantageously, by the guiding action of the channel 6 and 7.

Customarily baking pans are made of extremely thin sheet metal and where, as here, such pan is made of two sections it is necessary not only to provide locking means but also stabilizing means. In the instant case the locking means simultaneously serve as stabilizing means.

The operation of the device of the invention is self-evident from the description and illustration. In the most compressed position, i. e. when the sections 1 and 2 are in the most telescoped position, for the smallest size cake, the ridges 4, 4' and 4'' are interlocked with their corresponding ridges 5 (and 5' and 5'', not shown), whereas in the most extended position, for the largest size cake ridge 4 would be interlocked with the outermost ridge (5'') of the other section. In short, in the embodiment shown, the pan is designed for three different cake sizes, depending on whether three or two of the buttons are, or only one of the buttons is, in operational contact. In each case, especially in the most extended position, the assembly of the two sections is stabilized, apart from the stabilization afforded by the overlap of the walls of such sections, by the beaded rims 3 and 3' and, further, by the interconnected bottom channels 6 and 7, serving also as rail guides. The localized friction areas, represented by the buttons formed by the ridges 4 and 5, also serve as abutments and indicators to the user of the particular size to which the pan has been extended or contracted. Normally the smallest size of such a baking pan will be that of a square shape, the larger sizes being of oblong shape.

In Figs. 5-10 I have illustrated another embodiment of the invention, in the form of a circular pan for baking such cakes as, e. g. angel-cakes.

Fig. 5 merely shows a cylindrical sidewall 8 fabricated from a suitable length of sheet metal. The cylindrical wall is designed to overlap at one end, e. g. and 9 overlapping the other end 10 on the inside thereof. The upper rim is curled over or beaded, as shown at 11 illustrated in more detail in Fig. 6, in a manner similar to the beaded rim of the embodiment of Fig. 1. The beaded rim toward the ends, 9 and 10, differs slightly so that one rim fits tightly into the other, usually, as shown, the rim at the end 10 fitting into the rim at the end 9, i. e. the rim of the encompassed end 9 fitting over the rim of the encompassing end 10 of the wall 8. As in the embodiment of Fig. 1, the telescoping rims are in firm frictional contact. Also, the rim extends along the upper edge of the wall. The rim 11 is at its outer part, i. e. the part into which the rim of the end 10 is fitted, notched at 12, 12' and 12'', for purposes more fully explained hereinafter. The lower edge of the wall 8 is slightly flanged inwardly as shown at 19. Fig. 7 shows the bottom section 13 of the pan. It is provided with a series (three as shown) annular ribs 14, 14' and 14''. Since this embodiment is illustrated in the form of a pan for angel cake, the bottom also contains an upwardly projecting conical center post 15 and depressions 16. In other types of baking pans such center post and depressions may, of course, be omitted and the bottom plate may be smooth and continuous, as shown in Fig. 7a. The depressions 16 also serve as rigidifying means. As shown more clearly in Figs. 8 and 9, the annular ribs 14, 14' and 14'' are provided with an undercut 18 forming an annular groove or channel, designed to receive the slightly flanged lower edge 19 of the wall 8. In the drawings I have shown one particularly desirable type of ridge formed by creating a loop-like fold in the bottom plate, but, of course, other forms of ridges with an under-cut may be used. The loop-like ridge is preferred due to the ease with which it can be manufactured. The loop-like ridge is like a wrinkle in the bottom plate. Due to the pressure of the frictionally telescoped rim 11, the flanged lower end 19 of the wall 8 engages the annular ribs 14 in like frictional contact along the undercut groove 18. Each such rib 14 and the flange 19 thus form a localized friction area. The ribs 14, 14' and 14'' thus serve in the nature of an abutment controlling the size of the baking pan.

In the operation of the cylindrical embodiment of my invention, as shown in Figs. 5-9, the sidewall 8 is placed in position along either ridge 14 or 14' or 14'', depending on the size of the cake to be baked, positioning along ridge 14 affording the largest size and positioning along ridge 14'' affording the smallest size. In each case the inwardly flanged lower edge 19 rests within the outer annular undercut groove 18.

In many cases, the firm frictional fit of the wall within the groove 18 is sufficient, in combination with the telescoping of the upper rim 11, to provide a firmly interlocked cake pan. However, in other cases it is necessary to provide additional locking means. Such locking means are illustrated in Fig. 10 and serve to supplement the pressure of the frictionally telescoping rim 11.

Referring to Fig. 10, I have shown a latch comprising a wire 20, e. g. steel wire, or rod secured within a hinge 21 having a passage 22 within which the wire is movably, i. e. rotatably, positioned. The hinge may be riveted, or otherwise fastened, to the wall 8 at the outwardly overlapping end 10. The rivets are indicated at 23. The steel wire 20 has an upwardly projecting parts, e. g. in the form of a loop 24, and terminal ends 25. The latch, further comprises wire 26 looped over the ends 25 of the wire 20. One end of the wire 26 is formed as a handle 27 and the other end, 28, may be secured in a flat plate 29 having a passage 30 within which it is rotatably arranged. The plate 29, is preferably secured, as e. g. by means of rivets 31, to a separate plate 17 which overlies the wall 10 and also travels at its upper and within the rim 11 and at its lower end also, preferably, within the undercut grooves 18.

The purpose and function of this latch is to lock the two ends, 9 and 10, of the sidewall 8 together in the desired position. This is accomplished by positioning the projection or key 24 within the notches or slots 12, 12' or 12" of the rim 11. In Fig. 10 the lock is shown in closed position at notch 12. Notches 12, 12' and 12" on the rim 11 correspond, relative to the key or stud 24, to a position of the sidewall in juxtaposition to the undercut grooves 18 of ridges 14, 14' and 14", respectively. Thus the position of the lock in Fig. 10 shows the sidewall 8 in juxtaposition against ridge 14, i. e. the largest size of the pan shown. By way of further illustration, if the wall 8 were positioned in conjunction with ridge 14' the key 24 would be located in mating notch 12', and so forth.

Thus, in the embodiment, the two sections, sidewall 8 and bottom plate 13 are secured together by means of the pressure exerted on the sidewall 8 by the latch key 24 against the undercut annular ridges 14, 14' and 14". Where the friction of the telescoping rim 11 is sufficiently strong to provide the necessary pressure to securely force the flanged end 19 of the rim 8 into the groove 18 of the ridges 14, etc., and keep it there, the latch may be omitted, but generally it is advantageous and also necessary to provide the supplemental pressure exerted by the latch.

In order to open the lock, it is only necessary to lift the handle 27, whereupon the wire 26, hinged within the passage 30, will lift the key 24 of wire 20, hinged in the passage 22, out of the notch 24.

I have thus provided a baking pan in which the two sections are fitted together and held together by cooperating interlocking means comprising a telescoping rim and friction means at the bottom. In the embodiment of Figs. 1–4 the bottom friction means consist of the localized ridges 4 and 5 and in the embodiment of Figs. 5–9 the bottom friction means consist of the ridge 18 and the flanged end 19, supplemented by the pressure exerted through the key 24 of the latch of Fig. 10 designed to increase, where necessary, the locking pressure of the telescoping rim 11.

The operation of the extensible baking pan of the invention is easy and simple. The sections of the pan are easily manufactured and the parts are easily assembled, without extraneous holding means such as loops, rings, etc.

Adjustable extensible baking pans have the further advantage that it is possible to disassemble the pan prior to removal of the cake. After such disassembly it is far easier to remove the cake without damage than is possible in the case of fixed baking pans where the cake must be removed from the pan, rather than, as in the case of extensible pans, removing the pan from the cake.

The parts or sections of my extensible, size adjustable, baking pan are thus held together by means of frictional engagement of the upper rim and by frictional bottom contact controlled by the friction pressure of the rim.

The pans and their parts are manufactured from suitable material, e. g. aluminum, tin, copper, and so forth.

It will be understood that various modifications of the invention as illustrated are possible, so long as the characteristic bottom friction area and rim frictional engagement are provided for. For instance in the drawings I have illustrated the undercut 18, designed to seat the flange 19, as an outside peripheral undercut of the ridge 14, 14' and 14", whereas in certain cases the undercut 18 could also be an inside undercut—i. e. opposite to that illustrated—with the flange 19 being seated in such inside undercut, pressure being asserted by the inherently outward pressure of the resilient wall 8.

What I claim is:

1. An annular extensible baking pan comprising an extensible split cylindrical wall and a bottom plate, said extensible wall being provided at its upper end with a telescoping rim and at its lower end with an inwardly extending flange, said upper rim having on one side of said split a plurality of spaced receiving members at spaced intervals, a lock member secured to said wall on the other side of said split, said lock member being engageable with said receiving members; said bottom plate being provided with a plurality of concentric annular ridges with an outer undercut groove, said flange of said wall being adapted to be seated in any of said undercut grooves, the pressure of the frictional contact of the telescoping rim maintaining said flange in one of said grooves.

2. An annular extensible baking pan comprising an extensible split cylindrical wall and a bottom plate, said extensible wall being provided at its upper end with a telescoping rim and at its lower end with an inwardly extending flange, said wall having on one side of said split a plurality of spaced receiving members at spaced intervals, a lock member secured to said wall on the other side of said split, said lock member being engageable with said receiving members, said bottom plate being provided with a plurality of concentric annular ridges with an outer undercut groove, said flange of said wall being adapted to be seated in any of said undercut grooves, the pressure of the telescoping rim maintaining said flange in one of said grooves, and the said receiving members being spaced relative to the concentric spacing of said plurality of annular ridges.

MANFRED DANZIGER.

REFERENCES CITED

The following references are of record in the file of this patent:

UNITED STATES PATENTS

| Number | Name | Date |
|---|---|---|
| 632,505 | Williamson | Sept. 5, 1899 |
| 709,150 | Halls | Sept. 16, 1902 |
| 986,848 | Nelson | Mar. 14, 1911 |
| 1,827,396 | Lucket | Oct. 13, 1931 |
| 1,858,179 | Bay | May 10, 1932 |
| 2,020,373 | Petzold | Nov. 12, 1935 |

FOREIGN PATENTS

| Number | Country | Date |
|---|---|---|
| 9,059 | Great Britain | Dec. 5, 1912 |
| 82,707 | Switzerland | Oct. 16, 1919 |
| 196,811 | Great Britain | May 3, 1923 |